Patented Nov. 7, 1944

2,361,987

UNITED STATES PATENT OFFICE 2,361,987

TITANIUM PIGMENT PRODUCTION

James Eliot Booge, Wilmington, Del., and Leland Stewart, St. George, Staten Island, N. Y., assignors to E. I. du Pont de Nemours & Company, Wilmington, Del., a corporation of Delaware No Drawing. Application November 2, 1940, Serial No. 364,038

10 Claims. (Cl. 23—202)

This invention relates to the production of titanium pigments possessing superior pigmentary properties, and more particularly to novel methods for obtaining such pigments. More specifically, it relates to the production of improved titanium oxide pigments by hydrolyzing relatively dilute titanium salt solutions followed by heating of the resulting hydrolysis precipitate under controlled conditions of elevated temperatures and superatmospheric pressures.

Titanium oxide pigments are usually obtained by precipitating the $TiO_2$ by hydrolyzing a titanium salt solution, and then subjecting the washed, purified raw pigment precipitate to calcination at temperatures ranging from substantially 650° C. to, say, about 1050° C., to develop essential pigment characteristics. At such order of temperatures objectionable sintering and agglomeration of the particles under treatment occurs to produce a calcined product which is objectionably hard and gritty in nature. The agglomerates, grit or hard particles which thus form cannot be satisfactorily removed and remain in the finished pigment even though prolonged grinding of the calcined product is resorted to. The presence of these agglomerates or grit particles in the finished pigment deleteriously affects its texture characteristics and renders it unfit for use in many desired commercial applications.

With a view to obviating calcination treatment of hydrolysis precipitates and overcoming its attendant disadvantages, it has been proposed to obtain titanium oxide pigments by hydrolyzing relatively concentrated titanium salt solutions, such as titanium sulfate, at elevated temperatures and pressures, or to heat-pressure treat acid solutions of the raw pigment or titanic acid obtained from such usual hydrolysis procedures at temperatures ranging from 250–370° C. However, the precipitate obtained from these procedures does not well respond to pigmentary development, nor are the final products therefrom completely satisfactory for pigment purposes because deficient to an objectionable extent in essential pigmentary characteristics, especially tinting strength and hiding power.

We have discovered that if precipitated titanic acid obtained from the hydrolysis of a relatively dilute, as distinguished from an ordinary or concentrated titanium salt solution, is subjected to heat-pressure treatment in the presence of water or dilute solutions of relatively strong acids, but at temperatures in excess of 370° C. and from at least 375° C. and to as high as, say, 500° C., quite unexpectedly one may obtain an improved titanium oxide pigment final product which possesses excellent tinting strength and hiding power, together with other essential, fully developed pigment characteristics.

In a specific and preferred embodiment, our invention comprises hydrolyzing a titanium sulfate solution of relatively low $TiO_2$ concentration (40 to 100 g./l.) to obtain the desired titanic acid precipitate, washing said precipitate to render the same substantially free of iron and other impurities, repulping the purified precipitate with water or solutions of dilute acid or neutral salts, subjecting the resulting suspension to heat-pressure treatment for a relatively short period of time, the temperature as employed being in excess of 370° C., and from about 400–450° C., while the pressure comprises that developed by the liquid at the temperature employed, thereafter filtering and washing the treated slurry and then drying the recovered product to obtain the finished, fully developed pigment titanium oxide.

The invention will be illustratively described as applied to one preferred adaptation thereof which involves the treatment of a TiO hydrolysate obtained from the hydrolysis of a relatively dilute titanium sulfate solution. Solutions of this character may be conveniently obtained by initially attacking a titaniferous material, such as ilmenite, with sulfuric acid and in accordance with, for instance, the procedures described in U. S. Patent 1,504,669 to Blumenfeld. The mass which results from said acid attack is dissolved in sufficient water or dilute sulfuric acid to obtain a solution containing at least 150 g. $TiO_2$ per liter. This solution, after the usual purification and clarification treatments, is then further suitably diluted, with relatively pure water or a very dilute sulfuric acid solution containing trivalent titanium, until its $TiO_2$ concentration ranges from, preferably, substantially 40 to 100 g. per liter. This final, dilute solution is then conventionally hydrolyzed, preferably in accordance with the methods described in U. S. Reissue Patents 18,854 to 18,790, wherein seeding or nucleation of the titanium liquor is first resorted to in order to initiate and accelerate subsequent hydrolysis. For instance, said hydrolysis may be initiated by forming the nuclei in the hydrolysis solution by gradually adding a relatively concentrated titanium sulfate solution to water, maintained at temperatures in the range of, say, from 80 to 100° C., or, if desired, may be separately formed by adding a small volume of the hydrolysis liquor (e. g., about 2% by volume) to about 50 volumes of water held at a temperature in the range of 80-100° C. for a period of about 2-10 minutes and then filtering to remove the sulfate ions. The resulting seed may be then incorporated in the hydrolysis solution. After suitable nucleation the seeded solution is heated to the boiling and there retained for a period of about one hour or until desired titanic acid precipitation becomes completely effected. The raw pigment resulting from such hydrolysis is then carefully washed to substantially completely remove all iron or other metallic or other undesired impurities, said washing being continued, preferably, until the wash water gives no reaction for said impurities. The purified precipitate is then repulped with water, to provide a slurry containing from about 5 to about 25% $TiO_2$ by weight, and, preferably, about 20% by weight, and is then autoclaved in accordance with our invention. If desired, the liquid with which the raw pigment is mixed prior to autoclaving may comprise a dilute solution of strong mineral or organic acids, such as sulfuric, hydrochloric, nitric, perchloric, hydrobromic, sulfonic, etc., or dilute solutions of neutral salts, such as sodium sulfate, potassium sulfate, potassium chloride, etc. In effecting said autoclaving, the slurry resulting from suspending the precipitate in water or acid media is introduced into a suitable reaction zone or vessel which is capable of withstanding relatively high pressures and temperatures, an autoclave or bomb type of vessel being suitable for the purpose. The charge is then heated quickly to a temperature in excess of substantially 370° C. and to, say, about 380° C. Thereafter, it is heated more slowly until a temperature of from substantially 400-450° C. is reached, the charge being maintained within such 400-450° C. temperature range for a period of from about 30 minutes to 3 hours, and at a pressure corresponding to that developed by the liquid under treatment in order to convert and develop the precipitate under treatment to a condition suitable for direct use as a pigment. Upon completion of said treatment the resulting product is removed from the pressure vessel, thoroughly washed to remove sulfuric acid released from combination with the titanium oxide, and the washed product is dried, at temperatures above 100° C. and preferably from about 110-120° C. The dried product comprises the fully-developed, final product possessing all essential pigment properties, especially high and satisfactory tinting strength.

To a more complete understanding of the invention, the following specific examples are given, each of which, it is to be understood, is merely in illustration but not in limitation of the invention:

*Example I*

One part by volume of titanium sulfate solution such as is obtained by attacking ilmenite with $H_2SO_4$ and containing 174 grams $TiO_2$, 127 grams iron and 629 grams total free and combined $H_2SO_4$ per liter was heated to 70° C. and added to about 2.5 parts by volume of boiling water at a uniform rate during a period of 30 minutes. The diluted solution containing 50 grams $TiO_2$ per liter was boiled for three hours, to complete the precipitation. The precipitate was washed until substantially free of iron and other impurities and was then repulped to give a slurry containing about 20% $TiO_2$ by weight and the slurry placed in a vessel capable of withstanding high pressures. The charge was heated to 380° C. during a period of about one hour and was heated from 380 to 425° during an additional period of 70 minutes. The temperature was maintained at 425° C. for one hour. The treated slurry was filtered and washed to remove $H_2SO_4$, liberated from combination with titanium oxide and the product dried at 110-120° C. The dried product was a white pigment of superior tinting strength, hiding power and small uniform particle size characteristics.

*Example II*

Titanium sulfate solution obtained by attacking ilmenite with $H_2SO_4$ was hydrolyzed at a $TiO_2$ concentration of 50 grams per liter by boiling for one hour after addition of seed equivalent to one per cent on the pigment basis. The seed was prepared by pouring a portion of the solution 2% by volume into a volume of water at 90° C. equal to 50 times the volume of solution, holding at 90° C. for 5-10 minutes and washing the precipitate to remove iron and other impurities. The precipitate from the hydrolysis was repulped with water to give a slurry containing about 20% pigment by weight. The slurry was placed in a pressure bomb with tantalum inner container. The charge was heated to 375° C. during an hour and then from 375° to 425° C. during a period of an additional hour and was held at 425° for one hour. After removal from the pressure bomb the product was washed to remove $H_2SO_4$ released from combination with $TiO_2$ by the autoclave treatment and was dried at a temperature of about 110° C. The dried product was an excellent white pigment characterized by tinting strength fully equal to that of commercial titanium oxide products produced by processes involving calcination.

While the invention has been described in connection with one preferred adaptation involving the treatment of a hydrolysis precipitate or hydrolysate from a relatively dilute titanium sulfate solution, it is generally applicable to the treatment of precipitates obtained from the hydrolysis of other titanium salt solutions having relatively low $TiO_2$ concentrations such as titanium chloride, titanium nitrate, etc. As already noted, it is essential and critical to our invention that the hydrolysates which are subjected to treatment shall comprises those obtained from relatively dilute titanium solutions, e. g., containing from, say, about 30 to 140 g. $TiO_2$ per liter. Usually the optimum concentration for hydrolysis in using a solution of titanium in combination with a monobasic acid is between about 60 and 120 g. $TiO_2$ per liter. Preferably, and in order to obtain optimum tinting strength, hiding power and other essential pigment characteristics in the final product, we treat precipitates resulting from the hydrolysis of titanium sulfate solutions containing from about 40-100 g. $TiO_2$ per liter; or titanium chloride or nitrate solutions containing from substantially 100-110 g. $TiO_2$ per liter.

Further, the autoclave temperatures are also critical to our invention. As noted, we contemplate using temperatures in excess of 370° C., and of the order ranging from not lower than substantially 375° C. to about 500° C. Preferably temperatures ranging from 400-450° C. are used, due to the fact that this range is most conducive to procuring optimum results hereunder. Furthermore, a temperature of about 425° C. is somewhat more satisfactory than a lower temperature, say, around 400° C. Accordingly, as a most preferred range we recommend use of temperatures from about 425° to 450° C. Ordinarily, temperatures in excess of substantially 500° C., though employable, need not be used, since most beneficial results accrue hereunder when said higher range is not exceeded. Holding the product under treatment for a longer time at a lower temperature will not be found as satisfactory as holding it a shorter time at a higher temperature. Holding the reaction charge for a period of about 1 hour and at the preferred indicated temperature range under the pressure developed by the liquid at the temperature employed will be usually found to give most satisfactory results. However, a holding time ranging from about 30 minutes to 3 hours is contemplated. Preferably, the charge is first heated quickly to about 380° C. and then heated from that temperature to the final temperature during a period of from 1 to 2 hours.

As already noted, the concentration of the raw pigment slurry during heat-pressure treatment, though preferably about 20% TiO₂ by weight, is variable within practical limits. Thus, it may range from about 5 to about 25% TiO₂ by weight. The liquid with which the pigment is mixed prior to autoclaving may be water or dilute solutions of free strong mineral or organic acids, such as sulfuric, perchloric, hydrochloric, nitric, organic, sulfonic, etc. Should water alone be added to a well-washed hydrolysis precipitate and the mixture heated under pressure to 400° C. or above, the H₂SO₄ which is chemically bound to the titanium oxide (about 7–8% on the TiO₂ basis) becomes released so that after autoclaving a sulfate-free TiO₂ pigment in contact with a dilute solution of H₂SO₄ results. The concentration of the ions present in contact with the pigment during the heat treatment may vary from, say, about 0 to 1 gram equivalent.

While we preferably employ our process in the production of straight TiO₂ pigments, it will be obvious that the same is applicable to the production of composite TiO₂ pigments containing various extenders, such as barium sulfate, calcium sulfate, silica, magnesia, etc., and that, if desired, the heat-pressure treatment may be conducted in the presence of various types of salts adapted to form co-precipitates with the titanium, such as the chlorides of barium or calcium, etc.

The products resulting from a practice of our invention will be found to be exceedingly useful in all fields wherein titanium pigments are employed and especially as essential ingredients in coating compositions employed in interior or exterior applications. By reason of the fact that calcination treatment to develop pigment characteristics is not required, the disadvantages arising by reason of such type of treatment are effectively remedied and the introduction of objectionable grit or aggregate particles into the finished pigment, which would seriously affect pigment texture characteristics is advantageously avoided. Furthermore, our novel pigments exhibit remarkably improved and superior tinting strength and hiding power characteristics. Additionally, the particle size of autoclaved products from low concentration hydrolysis in accordance with our invention will be found to be much smaller and more uniform than a high concentration hydrolysis product.

The following table and data comparably illustrate the pigment tinting strength results obtainable by prior autoclaving methods and those obtainable from a practice of our invention. As is well known, tinting strength is the measure of the effectiveness of a white pigment in covering up the tint of a colored pigment admixed therewith, and is also the measure of the hiding power of a pigment in an enamel paint formulation. The property is relative in nature and results are obtained in comparison with another pigment used as a standard. These results depend upon the standard for magnitude, but are independent of the standard for relative order. These tinting strength determinations may be obtained in accordance with substantially the method described by James E. Booge and H. E. Eastlack in "Paints, Oil and Chemical Review," April 16, 1924. In the following table the TiO₂ employed as a standard comprised commercial anatase obtained by conventional calcination procedures, and, in accordance with the foregoing Booge, et al. method, possessed a tinting strength value of about 150. As will be noted, the specified materials were subjected to autoclaving treatment in accordance with the series of temperatures specified, to produce a product having the tinting strength value given. As will be apparent, the products from high concentration hydrolysis were unsatisfactorily low in commercial pigment tinting strength requirements, whereas those from low concentration hydrolysis, as contemplated by us, usually resulted in a product substantially meeting or resulted in a product substantially meeting or exceeding said commercial tinting strength values:

*Effect of TiO₂ concentration during autoclave hydrolysis*

| TiO₂ conc. during hydrolysis | Tinting strength of autoclaved product | | |
|---|---|---|---|
| | 360° C. series | 375° C. series | 425° C. series |
| 30 gms./liter | 80 | 135 | 145 |
| 50 gms./liter | 92 | 148 | 150 |
| 80 gms./liter | 95 | 150 | 160 |
| 100 gms./liter | 85 | 145 | 153 |
| 120 gms./liter | 100 | 138 | 145 |
| 150 gms./liter | 36 | 60 | 41 |
| 170 gms./liter | 34 | 40 | 40 |

We claim as our invention:

1. A process for producing an improved titanium oxide pigment possessing essential tinting strength and hiding power without calcination treatment, which comprises subjecting an aqueous suspension of a purified raw pigment titanic acid precipitate recovered from the hydrolysis of a dilute titanium salt solution to heat and pressure treatment, in a closed container, at an elevated temperature ranging from substantially 375° C. to 500° C. and at a pressure generated by the fluid at the temperature employed.

2. A process for producing an improved titanium oxide pigment exhibiting essential tinting strength and hiding power without calcination treatment, which comprises subjecting an aqueous suspension of a purified raw pigment titanic acid precipitate recovered from the hydrolysis of a dilute titanium sulfate solution to heat and pressure treatment, in a closed container, at a temperature ranging from at least 375° C. to as high as substantially 500° C. under a superatmospheric pressure developed by the fluid at the temperature employed.

3. A process for producing without calcination treatment an improved titanium oxide pigment possessing essential tinting strength and hiding power characteristics, which comprises subjecting an aqueous suspension of a purified raw pigment titanic acid precipitate recovered from the hydrolysis of a titanium sulfate solution in which the $TiO_2$ concentration ranges from substantially 30 to 140 g. per liter to heat and pressure treatment, in a closed container, at an elevated temperature ranging from substantially 375° C. to 500° C. and at the pressure developed by the fluid at the temperature employed.

4. A process for producing without calcination treatment an improved titanium oxide pigment possessing essential tinting strength and hiding power characteristics, which comprises subjecting an aqueous suspension of a purified raw pigment titanic acid precipitate recovered from the hydrolysis of a dilute titanium sulfate solution having a $TiO_2$ concentration ranging from substantially 40 to 100 g. per liter, to heat and pressure treatment in a closed container at an elevated temperature ranging from substantially 400° C. to 500° C. and at the pressure developed by the fluid at the temperature employed.

5. A process for producing an improved titanium oxide pigment possessing requisite tinting strength and hiding power values without calcining the same, which comprises subjecting an aqueous suspension of the purified raw pigment recovered from the hydrolysis of a dilute titanium sulfate solution containing from substantially 30 to 140 g. $TiO_2$ per liter, to heat and pressure treatment, in a closed container, and effecting said treatment at temperatures ranging from substantially 400–500° C. and under a pressure generated by the fluid at the temperature employed.

6. A process for producing an improved titanium oxide pigment possessing requisite tinting strength and hiding power values without calcining the same, which comprises subjecting an aqueous suspension of the purified raw pigment recovered from the hydrolysis of a dilute titanium chloride solution containing from substantially 30 to 140 g. $TiO_2$ per liter, to heat and pressure treatment, in a closed container, and effecting said treatment at temperatures ranging from substantially 400–500° C. and under a pressure generated by the fluid at the temperature employed.

7. A process for producing an improved titanium oxide pigment possessing requisite tinting strength and hiding power values without calcining the same, which comprises subjecting an aqueous suspension of the purified raw pigment recovered from the hydrolysis of a dilute titanium nitrate solution containing from substantially 30 to 140 g. $TiO_2$ per liter, to heat and pressure treatment in a closed container, and effecting said treatment at temperatures ranging from substantially 400–500° C. and under a pressure generated by the fluid at the temperature employed.

8. A process for producing an improved titanium oxide pigment possessing requisite tinting strength and hiding power values without resorting to calcination treatment, which comprises subjecting an aqueous slurry suspension containing from 5% to 20% $TiO_2$ by weight of the purified raw pigment hydrolysate from the hydrolysis of a dilute titanium salt solution, containing from substantially 30 to 140 g. $TiO_2$ per liter, to heat and pressure treatment in a closed container for a period ranging from about 30 minutes to 3 hours, during which treatment the $TiO_2$ is initially quickly heated to a temperature of about 375° C., maintained at said temperature for a short period of time, and is thereafter heated up to substantially 500° C. for the balance and major portion of the treating time, the pressure employed in the process being that generated by the fluid at the prevailing temperature.

9. A process for producing an improved titanium oxide pigment possessing requisite tinting strength and hiding power values without resorting to calcination treatment, which comprises subjecting an aqueous slurry suspension containing from 5% to 20% $TiO_2$ by weight of the purified raw pigment hydrolysate recovered from the hydrolysis of a dilute titanium sulfate solution containing from substantailly 30 to 140 g. $TiO_2$ per liter to heat and pressure treatment in a closed container for a period of from about 30 minutes to 3 hours, during which treatment the $TiO_2$ is initially quickly heated to a temperature of about 375° C., maintained at said temperature for a short period of time, and thereafter heated up to substantially 500° C. for the balance and major portion of the treating time, the pressure employed in the process being that generated by the fluid at the prevailing temperature.

10. A process for producing an improved titanium oxide pigment possessing requisite tinting strength and hiding power values without calcining the same, which comprises subjecting an aqueous slurry suspension containing from 5% to 20% $TiO_2$ by weight of the purified raw pigment hydrolysate recovered from the hydrolysis of a dilute titanium sulfate solution containing from about 40 to 100 g. $TiO_2$ per liter, to heat and pressure treatment in a closed container for a period ranging from about 30 minutes to 3 hours, during the initial period of said treatment quickly heating to and maintaining the $TiO_2$ under treatment at a temperature of about 375° C. for a short period of time, thereupon raising the temperature up to about 400° C. to 450° C. and maintaining the same within that temperature range for the balance and major portion of the treating time, and throughout all of said treatment employing a superatmospheric pressure generated by the fluid at the prevailing temperatures.

JAMES ELIOT BOOGE.
LELAND STEWART.

CERTIFICATE OF CORRECTION.

Patent No. 2,361,987. November 7, 1944.

JAMES ELIOT BOOGE, ET AL.

It is hereby certified that error appears in the printed specification of the above numbered patent requiring correction as follows: Page 1, second column, line 45, for "18,854 to" read --18,854 or--; page 2, first column, line 75, for "stanting" read --standing--; and second column, line 50, for "comprises" read --comprise--; page 3, second column, line 29, strike out the words "resulted in a product substantially meeting or"; and that the said Letters Patent should be read with this correction therein that the same may conform to the record of the case in the Patent Office.

Signed and sealed this 27th day of February, A. D. 1945.

Leslie Frazer (Seal) Acting Commissioner of Patents.